(12) United States Patent
Hsu

(10) Patent No.: US 9,495,500 B2
(45) Date of Patent: Nov. 15, 2016

(54) METHOD OF MAKING STACKED CHIP LAYOUT

(71) Applicant: TAIWAN SEMICONDUCTOR MANUFACTURING COMPANY, LTD., Hsinchu (TW)

(72) Inventor: Ying-Yu Hsu, Hsinchu (TW)

(73) Assignee: TAIWAN SEMICONDUCTOR MANUFACTURING COMPANY, LTD. (TW)

(*) Notice: Subject to any disclaimer, the term of this patent is extended or adjusted under 35 U.S.C. 154(b) by 0 days.

(21) Appl. No.: 14/855,494

(22) Filed: Sep. 16, 2015

(65) Prior Publication Data

US 2016/0004807 A1    Jan. 7, 2016

Related U.S. Application Data

(62) Division of application No. 14/015,262, filed on Aug. 30, 2013, now Pat. No. 9,159,716.

(51) Int. Cl.
| | |
|---|---|
| *H01L 21/44* | (2006.01) |
| *G06F 17/50* | (2006.01) |
| *H01L 25/065* | (2006.01) |
| *H01L 25/00* | (2006.01) |
| *H01L 23/36* | (2006.01) |

(52) U.S. Cl.
CPC ....... *G06F 17/5072* (2013.01); *G06F 17/5077* (2013.01); *H01L 23/36* (2013.01); *H01L 25/0657* (2013.01); *H01L 25/50* (2013.01); H01L 2924/0002 (2013.01)

(58) Field of Classification Search
CPC ... H01L 23/34; H01L 23/5386; H01L 25/50; H01L 25/0657
USPC .................................................. 438/109, 107
See application file for complete search history.

(56) References Cited

U.S. PATENT DOCUMENTS

| | | | |
|---|---|---|---|
| 6,621,155 B1* | 9/2003 | Perino | H01L 23/3128 174/538 |
| 2009/0039492 A1 | 2/2009 | Kang et al. | |
| 2010/0265751 A1* | 10/2010 | Hong | G11C 5/06 365/51 |

* cited by examiner

*Primary Examiner* — Hung Vu
(74) *Attorney, Agent, or Firm* — Hauptman Ham, LLP

(57) ABSTRACT

A method of making a stacked chip layout includes placing a first active circuit block over a central processing chip having a first area, the first active circuit block having a second area less than the first area. The method further includes placing a second active circuit block over the first active circuit block, the second active circuit block having a third area less than the first area, wherein the second active circuit block partially overlaps the first active circuit block and exposes a portion of the first active circuit block. The method further includes placing a third active circuit block over the second active circuit block wherein the third active circuit block partially overlaps at least one of the first active circuit block or the second active circuit block, and the third active circuit block exposes at least a portion of the first and second active circuit blocks.

20 Claims, 11 Drawing Sheets

METHOD OF MAKING STACKED CHIP LAYOUT

PRIORITY CLAIM

The present application is a divisional of U.S. application Ser. No. 14/015,262, filed Aug. 30, 2013, which is incorporated herein by reference in its entirety.

BACKGROUND

Packaging arrangements for multiple active circuit blocks are used to provide electrical connection between the active circuit blocks. A two-dimensional (2D) packaging arrangement has a central processing chip along with one or more active circuit blocks arranged on a same plane in a two-dimensional layout. The 2D packaging arrangement includes electrical routing for transferring signals between the active circuit blocks and between an active circuit block and the central processing chip on a same plane as the active circuit blocks.

A 2.5D packaging arrangement includes the central processing chip on a first plane and each of the active circuit blocks on a second plane different from the first plane. Electrical routing for transferring signals between the active circuit blocks is present in both planes of the 2.5D packaging arrangement.

A three dimensional (3D) packaging arrangement has the central processing chip and each active circuit block on a separate plane. A size of the active circuit blocks is artificially increased so that an area of the active circuit block substantially matches an area of the central processing chip. The size increase of the active circuit blocks does not increase a number of active elements within an active circuit block. The increased size is used to enable electrical routing to transfer signals between the various active circuit blocks and the central processing chip. The electrical routing lines from one plane to another pass through intervening active circuit blocks between active elements within the active circuit block.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

Figure 1:
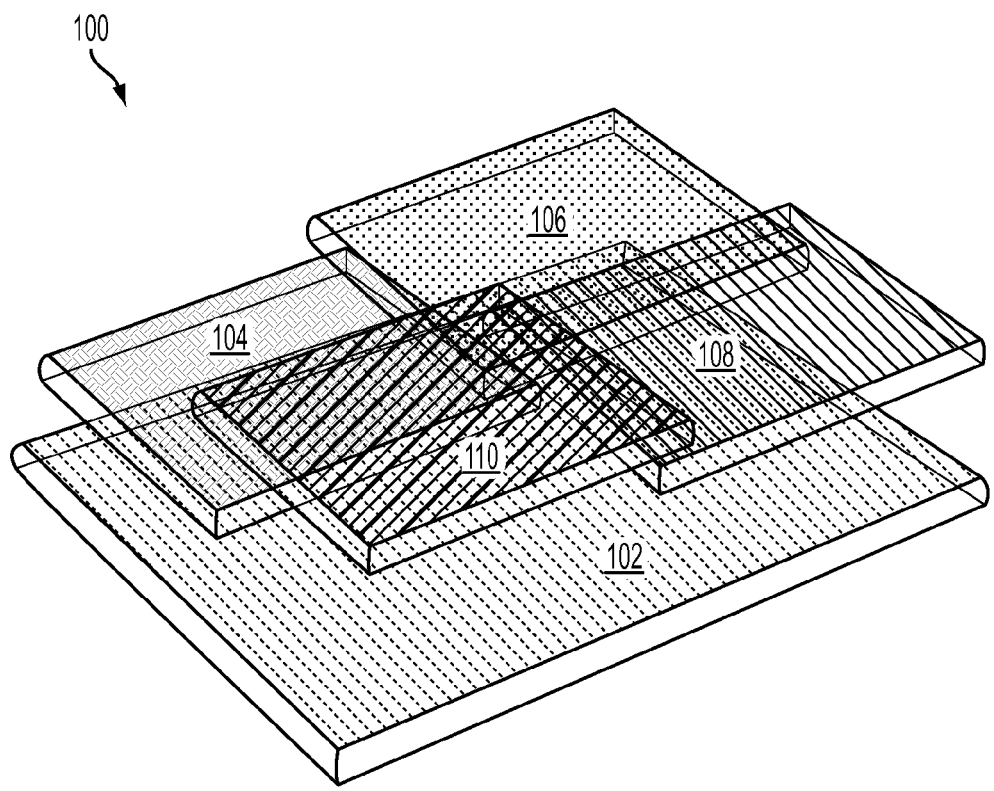
FIG. 1 is a perspective view of a stacked chip layout including four active circuit blocks in accordance with one or more embodiments.

The following disclosure provides many different embodiments, or examples, for implementing different features of the invention. Specific examples of components and arrangements are described below to simplify the present disclosure. These are examples and are not intended to be limiting.

Challenges which impact packaging of multiple active circuit blocks into a single structure include routing of interconnect lines between the active circuit blocks, routing of power lines to the active circuit blocks and dissipation of heat generated by the active circuit blocks. As technology nodes shrink, a size of the active circuit blocks decrease; however, a number of active elements within each active circuit block remains unchanged, in some embodiments. Due to the number of active elements remaining constant, a number of connections between the active circuit blocks also remain constant.

The decreased active circuit block size in conjunction with the constant number of connections increases a complexity of routing of the electrical signals between active circuit blocks and between the active circuit blocks and a central processing chip. In some 2D packaging arrangements, an overall area of the package is increased to enable routing of interconnect structures between the various active circuit blocks. The overall area of the 2D packaging arrangement is increased to provide adequate spacing between signal lines and power lines to reduce interference and cross talk between the lines. The increase in the overall area also increases a length of the conductive lines carrying the signals between components which introduce errors into the signals, in some instances.

In some 2.5D packaging arrangements, a complexity of the interconnect structure routings are increased. In some instances, modifications to the active circuit block are used to enable placement of the active circuit block in a desired location on the packaging arrangement. As a result, complexity of design and production costs increase due to the complexity of the interconnect structure.

In some 3D packaging arrangements, interconnect structures are routed between active elements of the active circuit blocks. Currents passing through interconnect structures interfere with operation of the active elements, in some instances. A higher current through the interconnect structure increases a risk of interference with the active elements. As a result, large spacing between interconnect structures and the active elements are maintained to reduce the risk of interference. The large spacing used in the 3D packaging arrangement increases the length of the interconnect structures which impacts timing of the active circuit block, in some instances. The risk of interference also restricts an amount of current which is applied through a power line used to power the various active circuit blocks. The power line current restrictions result in an increase in a number of power lines used to provide sufficient power to operate the various active circuit blocks or an increase in a number of separate active circuit block stacks to provide a same function, in some instances.

Some 3D packaging arrangements also experience problems with dissipating heat generated during operation of the various active circuit blocks. By stacking the active circuit blocks directly on top of one another, heat generated during operation is trapped and negatively impacts performance of the active circuit blocks, in some instances.

FIG. 1 is a perspective view of a stacked chip layout 100 including four active circuit blocks in accordance with one or more embodiments. Chip layout 100 includes a central processing chip 102 having a first area. Chip layout 100 further includes a first active circuit block 104 containing active elements disposed over central processing chip 102. First active circuit block 104 has a second area less than the first area of central processing chip 102. Chip layout 100 further includes a second active circuit block 106 over first active circuit block 104. Second active circuit block 106 partially overlaps with first active circuit block 104, but does not fully overlap with the first active circuit block. Second active circuit block 106 has a third area less than the first area of central processing chip 102. Chip layout 100 further includes a third active circuit block 108 over second active circuit block 106. Third active circuit block 108 partially overlaps with second active circuit block 106, but does not fully overlap with the second active circuit block. Third active circuit block 108 does also partially overlaps with first active circuit block 104. A portion of third active circuit block 108 overlaps with both second active circuit block 106 and first active circuit block 104. Third active circuit block 108 has a fourth area less than the first area of central processing chip 102. Chip layout 100 further includes a fourth active circuit block 110 over third active circuit block 108. Fourth active circuit block 110 partially overlaps with third active circuit block 108, but does not fully overlap with the third active circuit block. Fourth active circuit block 110 also partially overlaps with first active circuit block 104. Fourth active circuit block 110 also partially overlaps with second active circuit block 106. A portion of fourth active circuit block 110 overlaps with third active circuit block 108, second active circuit block 106 and first active circuit block 104. Fourth active circuit block 110 has a fifth area less than the first area of central processing chip 102.

In the arrangement of FIG. 1, each of first active circuit block 104, second active circuit block 106, third active circuit block 108 and fourth active circuit block 110 are aligned with a corner of central processing chip 102. In some embodiments, at least one of first active circuit block 104, second active circuit block 106, third active circuit block 108 or fourth active circuit block 110 is not aligned with a corner of central processing chip 102. In the arrangement of FIG. 1, each of first active circuit block 104, second active circuit block 106, third active circuit block 108 and fourth active circuit block 110 has a same area. In some embodiments, at least one of first active circuit block 104, second active circuit block 106, third active circuit block 108 or fourth active circuit block 110 has a different area from at least another of the other active circuit blocks.

Each of first active circuit block 104, second active circuit block 106, third active circuit block 108 and fourth active circuit block 110 contain active circuitry. In some embodiments, the active circuitry includes memory, such as dynamic random access memory (DRAM), an application specific integrated circuit (ASIC) or another suitable active circuit device. Each of first active circuit block 104, second active circuit block 106, third active circuit block 108 and fourth active circuit block 110 are connected to central processing chip 102. At least one of first active circuit block 104, second active circuit block 106, third active circuit block 108 or fourth active circuit block 110 is connected to at least another one of the first active circuit block, the second active circuit block, the third active circuit block or the fourth active circuit block.

Figure 2:
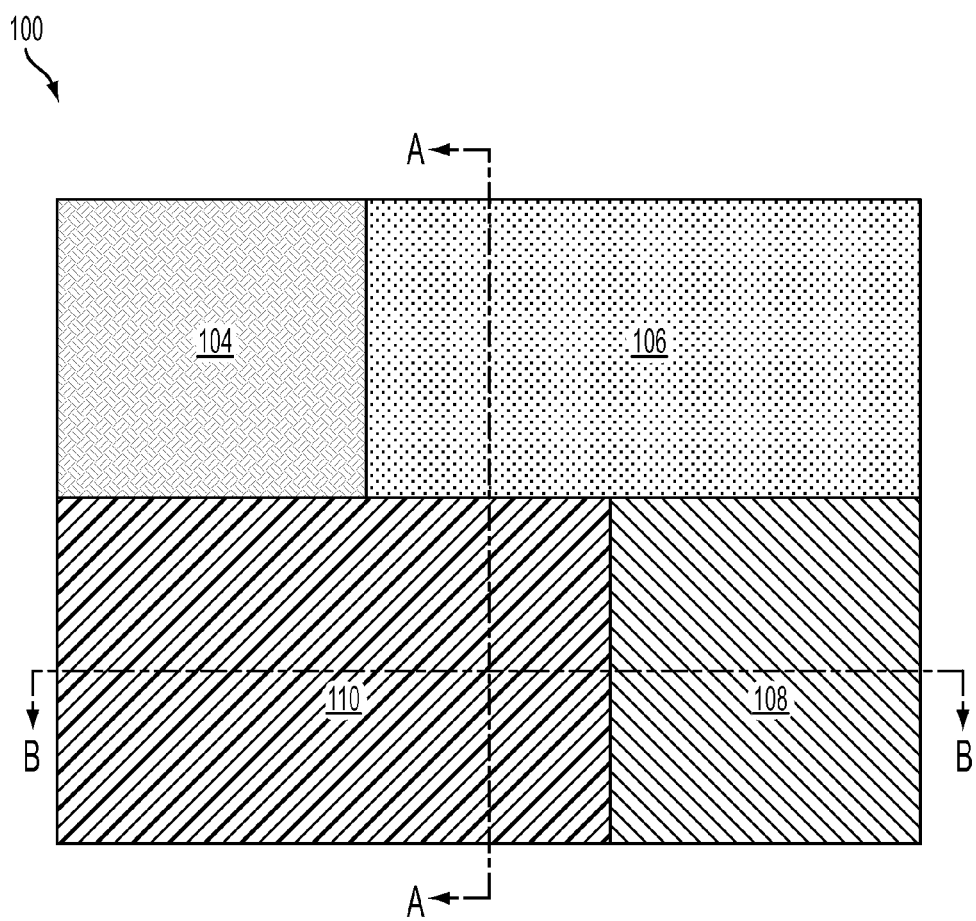
FIG. 2 is a top view of the stacked chip layout of FIG. 1 in accordance with one or more embodiments.

FIG. 2 is a top view of the stacked chip layout 100 in accordance with one or more embodiments. The top view of chip layout 100 indicates that a portion of each of first active circuit block 104, second active circuit block 106 and third active circuit block 108 is exposed by active circuit blocks positioned above each of the first active circuit block, the second active circuit block and the third active circuit block. By exposing a portion of each of each of first active circuit block 104, second active circuit block 106 and third active circuit block 108, heat generated by the active circuit blocks is more easily dissipated in comparison with packaging arrangements which completely cover active circuit blocks, such as 3D packaging arrangements.

In the arrangement of FIG. 2, central processing chip 102 is completely covered by the combination of first active circuit block 104, second active circuit block 106, third active circuit block 108 and fourth active circuit block 110. In some embodiments, a portion of central processing chip 102 is exposed by the combination of first active circuit block 104, second active circuit block 106, third active circuit block 108 and fourth active circuit block 110.

Figure 3:
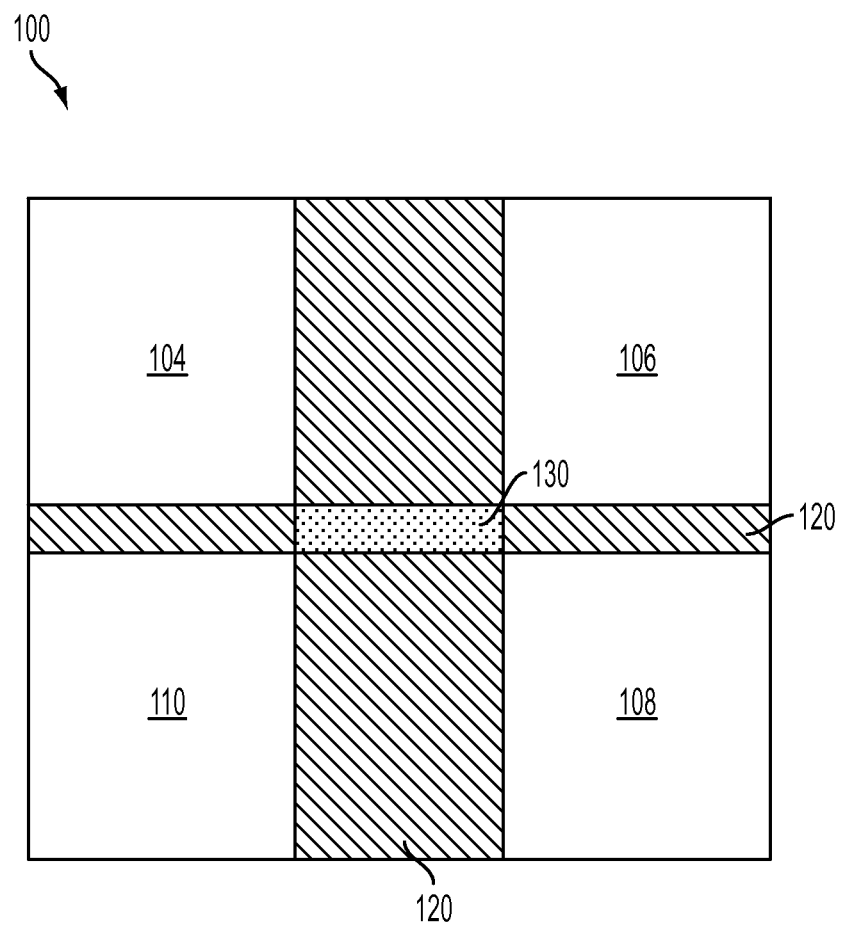
FIG. 3 is a top view of the stacked chip layout of FIG. 1 including partial overlap and full overlap areas in accordance with one or more embodiments.

FIG. 3 is a top view of the stacked chip layout 100 including partial overlap and full overlap areas in accordance with one or more embodiments. Chip layout 100 includes four partial overlap areas 120 where less than all of first active circuit block 104, second active circuit block 106, third active circuit block 108 and fourth active circuit block 110 overlap one another. In the arrangement of FIG. 3, partial overlap area 120 between third active circuit block 108 and fourth active circuit block 110 is larger than partial overlap area 120 between the third active circuit block and second active circuit block 106. In some embodiments, each partial overlap area 120 has a same size. In some embodiments, each partial overlap area 120 has a different size from each other partial overlap area 120. Chip layout 100 further includes a full overlap area 130. Full overlap area 130 is a place where all of first active circuit block 104, second active circuit block 106, third active circuit block 108 and fourth active circuit block 110 overlap one another.

Partial overlap areas 102 are used to provide electrical connections between the overlapping active circuit blocks. In some embodiments, the electrical connections include inter-level vias (ILVs) formed in a dielectric material. In some embodiments, the electrical connections include solder balls, copper posts or other suitable electrical connection structures.

Full overlap area 130 is used to provide connection between all of first active circuit block 104, second active circuit block 106, third active circuit block 108 and fourth active circuit block 110 along with central processing chip 102. Signals which are shared by all of the active circuit blocks are routed through full overlap area 130. A size of full overlap area 130 is determined based on a size and layout of the active circuit blocks. The size of the full overlap area 130 is minimized to help increase an ability of chip layout 100 do dissipate heat generated by the active circuit blocks and to facilitate routing of electrical signals between the active circuit blocks.

Figure 4:
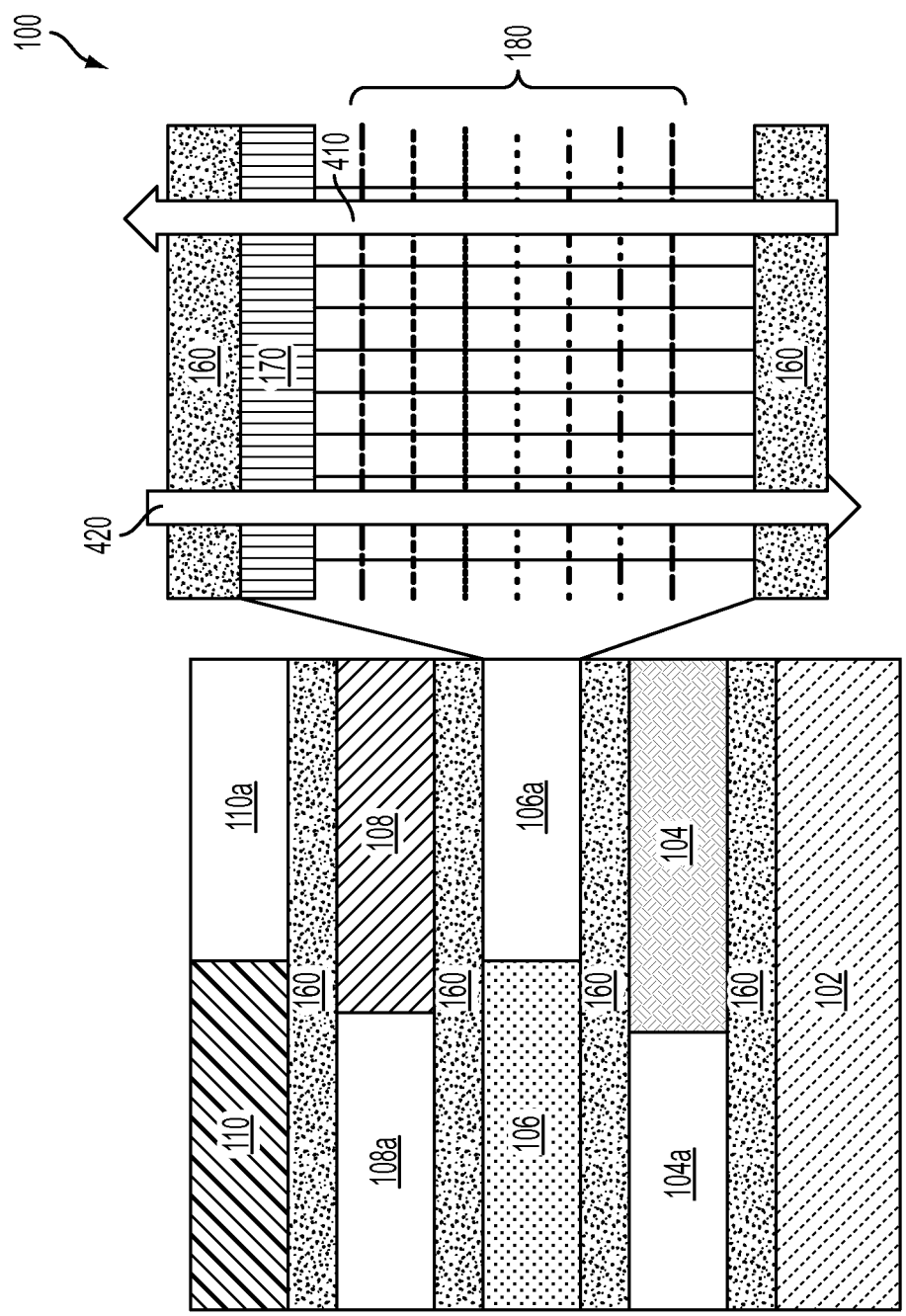
FIG. 4 is a cross sectional view of the stacked chip layout of FIG. 1 including an enlarged cross sectional view of a routing area in accordance with one or more embodiments.

FIG. 4 is a cross sectional view of the stacked chip layout 100 including an enlarged cross sectional view of a routing area in accordance with one or more embodiments. FIG. 4 is the cross section view along line A-A of FIG. 2 in accordance with one or more embodiments. Chip layout 100 includes ILV layers 160 positioned between each of central processing chip 102, first active circuit block 104, second active circuit block 106, third active circuit block 108 and fourth active circuit block 110. Chip layout 100 further includes a first routing area 104a on a same plane as first active circuit block 104. First routing area 104a has an area equal to a difference between the second area of first active circuit block 104 and the first area of central processing chip 102. Chip layout 100 further includes a second routing area 106a on a same plane as second active circuit block 106. Second routing area 106a has an area equal to a difference between the third area of second active circuit block 106 and the first area of central processing chip 102. Chip layout 100 further includes a third routing area 108a on a same plane as third active circuit block 108. Third routing area 108a has an area equal to a difference between the fourth area of third active circuit block 108 and the first area of central processing chip 102. Chip layout 100 further includes a fourth routing area 110a on a same plane as fourth active circuit block 110. Fourth routing area 110a has an area equal to a difference between the fifth area of fourth active circuit block 110 and the first area of central processing chip 102.

ILV layers 160 include a dielectric material having conductive vias formed therein. The conductive vias provide electrical connection for signal transfer between layers of chip layout 100. In some embodiments, the dielectric material includes silicon oxide, silicon nitride, silicon carbide, silicon oxynitride or other suitable dielectric materials. In some embodiments, the conductive vias include copper, aluminum, alloys thereof or other suitable conductive materials.

First routing area 104a is a dielectric material having conductive lines and/or vias formed therein. The conductive lines and or vias provide electrical connections for signal transfer between first active circuit block 104 and other components of chip layout 100. In some embodiments, first routing area 104a includes conductive vias configured to electrically connect at least one of second active circuit block 106, third active circuit block 108 or fourth active circuit block 110 to central processing chip 102. In some embodiments, first routing area 104a is configured to electrically connect ILV layer 160 between first active circuit block 104 and central processing chip 102 with ILV layer 160 between the first active circuit block and second active circuit block 106. In some embodiments, the dielectric material of first routing layer 104a includes silicon oxide, silicon nitride, silicon carbide, silicon oxynitride or other suitable dielectric materials. In the embodiment of FIG. 4, the dielectric material of first routing area 104a is different from the dielectric material of ILV layer 160, so that the dielectric materials act as etch stop layers during formation of the conductive lines and/or vias. In some embodiments, the dielectric material of first routing area 104a is a same dielectric material as the dielectric material of ILV layers 160. In some embodiments, the conductive lines and/or vias of first routing area 104a include copper, aluminum, alloys thereof or other suitable conductive materials. In some embodiments, the conductive vias of ILV layers 160 include a same material as the conductive lines and/or vias of first routing area 104a. In some embodiments, the conductive vias of ILV layers 160 include a different material from the conductive lines and/or vias of first routing area 104a.

Second routing area 106a is a dielectric material having conductive lines and/or vias formed therein. The conductive lines and or vias provide electrical connections for signal transfer between second active circuit block 106 and other components of chip layout 100. In some embodiments, second routing area 106a includes conductive vias configured to electrically connect at least one of third active circuit block 108 or fourth active circuit block 110 to central processing chip 102. In some embodiments, second routing area 106a is configured to electrically connect ILV layer 160 between first active circuit block 104 and second active layer 106 with ILV layer 160 between the second active circuit block and third active circuit block 108. In some embodiments, the dielectric material of second routing area 106a is a same material as the dielectric material of first routing area 104a. In some embodiments, the dielectric material of second routing area 106a is different from the dielectric material of first routing area 104a. In the embodiment of FIG. 4, the dielectric material of second routing area 106a is different from the dielectric material of ILV layer 160, so that the dielectric materials act as etch stop layers during formation of the conductive lines and/or vias. In some embodiments, the dielectric material of second routing area 106a is a same dielectric material as the dielectric material of ILV layers 160. In some embodiments, the conductive lines and/or vias of second routing area 106a are a same material as first routing area 104a. In some embodiments, the conductive lines and/or vias of second routing area 106a are different from the material of the conductive lines and/or vias of first routing area 104a. In some embodiments, the conductive vias of ILV layers 160 include a same material as the conductive lines and/or vias of second routing area 106a. In some embodiments, the conductive vias of ILV layers 160 include a different material from the conductive lines and/or vias of second routing area 106a.

Third routing area 108a is a dielectric material having conductive lines and/or vias formed therein. The conductive lines and or vias provide electrical connections for signal transfer between third active circuit block 108 and other components of chip layout 100. In some embodiments, third routing area 108a includes conductive vias configured to electrically connect fourth active circuit block 110 to central processing chip 102. In some embodiments, third routing area 108a is configured to electrically connect ILV layer 160 between third active circuit block 108 and second active layer 106 with ILV layer 160 between the third active circuit block and fourth active circuit block 110. In some embodiments, the dielectric material of third routing area 108a is a same material as the dielectric material of first routing area 104a and second routing area 106a. In some embodiments, the dielectric material of third routing area 108a is different from the dielectric material of at least one of first routing area 104a or second routing area 106a. In the embodiment of FIG. 4, the dielectric material of third routing area 108a is different from the dielectric material of ILV layer 160, so that the dielectric materials act as etch stop layers during formation of the conductive lines and/or vias. In some embodiments, the dielectric material of third routing area 108a is a same dielectric material as the dielectric material of ILV layers 160. In some embodiments, the conductive lines and/or vias of third routing area 108a are a same material as first routing area 104a and second routing area 106a. In some embodiments, the conductive lines and/or vias of third routing area 108a are different from the material of the conductive lines and/or vias of at least one of first routing area 104a or second routing area 106a. In some embodiments, the conductive vias of ILV layers 160 include a same material as the conductive lines and/or vias of third routing area 108a. In some embodiments, the conductive vias of ILV layers 160 include a different material from the conductive lines and/or vias of third routing area 108a.

Fourth routing area 110a is a dielectric material having conductive lines and/or vias formed therein. The conductive lines and or vias provide electrical connections for signal transfer between fourth active circuit block 110 and other components of chip layout 100. In some embodiments, fourth routing area 110a is configured to electrically connect to ILV layer 160 between third active circuit block 108 and fourth active layer 110. In some embodiments, the dielectric material of fourth routing area 110a is a same material as the dielectric material of first routing area 104a, second routing area 106a and third routing area 108a. In some embodiments, the dielectric material of fourth routing area 110a is different from the dielectric material of at least one of first routing area 104a, second routing area 106a or third active circuit block 108a. In the embodiment of FIG. 4, the dielectric material of fourth routing area 110a is different from the dielectric material of ILV layer 160, so that the dielectric materials act as etch stop layers during formation of the conductive lines and/or vias. In some embodiments, the dielectric material of fourth routing area 110a is a same dielectric material as the dielectric material of ILV layers 160. In some embodiments, the conductive lines and/or vias of fourth routing area 110a are a same material as first routing area 104a, second routing area 106a and third routing area 108a. In some embodiments, the conductive lines and/or vias of fourth routing area 110a are different from the material of the conductive lines and/or vias of at least one of first routing area 104a, second routing area 106a or third routing area 108a. In some embodiments, the conductive vias of ILV layers 160 include a same material as the conductive lines and/or vias of fourth routing area 110a. In some embodiments, the conductive vias of ILV layers 160 include a different material from the conductive lines and/or vias of fourth routing area 110a.

FIG. 4 also includes an enlarged cross sectional view of second routing area 106a. Second routing area 106a includes a heat dissipation element 170 at a surface of the second routing area distal from central processing chip 102. Second routing area 106a further includes power lines 180 configured to provide power to second active circuit block 106. In some embodiments, first routing area 104a, third routing area 108a and fourth routing area 110a include similar structures as second routing area 106a.

Heat dissipation element 170 in second routing area 106a is in thermal contact with a second active circuit block 106. In some embodiments, heat dissipation element 170 in second routing area 106a is in physical contact with second active circuit block 106. In some embodiments, heat dissipation element 170 contacts a sidewall of second active circuit block 106. In some embodiments, heat dissipation element 170 contacts a top surface of second active circuit block 106. Heat dissipation element 170 is configured to conduct heat generated by second active circuit block 106 away from the second active circuit block and enable effective heat transfer along chip layout 100. Arrow 410 indicates heat flow toward central processing chip 102 along chip layout 100 facilitated by heat dissipation element 170. Arrow 420 indicates heat flow toward fourth active circuit block 110 along chip layout 100 facilitated by heat dissipation element 170. In some embodiments, heat dissipation element 170 includes copper, aluminum, alloys thereof or other suitable thermal conductive materials.

Power lines 180 are formed in the dielectric material of second routing area 106a. Power lines 180 are configured to provide electrical power to second active circuit block 106. In some embodiments power lines 180 include copper, aluminum, alloys thereof or other suitable thermal conductive materials. In some embodiments, power lines 180 are connected to an external power supply. In some embodiments, power lines 180 are connected to a power supply within chip layout 100.

Power lines 180 are capable of transferring a higher current than power lines in packaging arrangements which route power lines between active elements. Second routing area 106a provides sufficient separation between active elements of active circuit block 106 and power lines 180 to facilitate higher currents through the power lines without a significant risk of interference with operation of the active elements in the second active circuit block.

Figure 5:
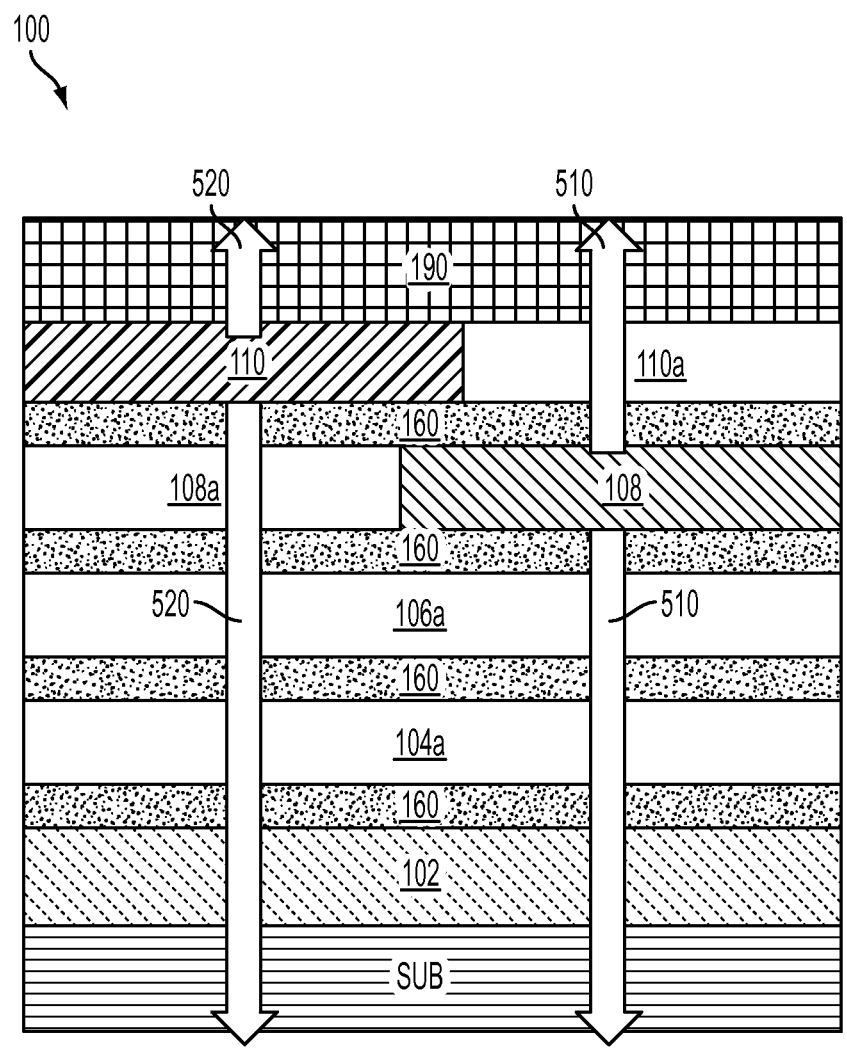
FIG. 5 is a cross sectional view of the stacked chip layout of FIG. 1 in accordance with one or more embodiments.

FIG. 5 is a cross sectional view of the stacked chip layout 100 in accordance with one or more embodiments. FIG. 5 is the cross section view along line B-B of FIG. 2 in accordance with one or more embodiments. In the arrangement of FIG. 5, chip layout 100 includes a heat dissipation element 190 over a top surface of fourth active circuit block 110 and fourth routing area 110a. Chip layout 100 further includes a substrate SUB connected to a bottom surface of central processing chip 102. First active circuit block 104 and second active circuit block 106 are not visible in FIG. 5, but are still present in chip layout 100.

Arrows 510 indicate heat dissipation from third active circuit block 108 through fourth routing area 110a to heat dissipation element 190 and from the third active circuit block through second routing area 106a, first routing area 104a and central processing chip 102 to substrate SUB. The heat from third active circuit block 108 is then transferred to a surrounding environment by convective heat transfer, radiation heat transfer or other heat transfer methods.

Arrows 520 indicate heat dissipation from fourth active circuit block 110 to heat dissipation element 190 and from the fourth active circuit block through third routing area 108a, second routing area 106a, first routing area 104a and central processing chip 102 to substrate SUB. The heat from fourth active circuit block 110 is then transferred to a surrounding environment by convective heat transfer, radiation heat transfer or other heat transfer methods.

The arrangement of chip layout 100 is able to transfer heat in a manner which reduces negative impacts of the heat on each active circuit block by dispersing the heat generated by third active circuit block 108 and fourth active circuit block 110 to areas which are not above first active circuit block 104 and second active circuit block 106. The resulting structure is able to operate with fewer errors in comparison with some other packaging arrangements.

Figure 6:
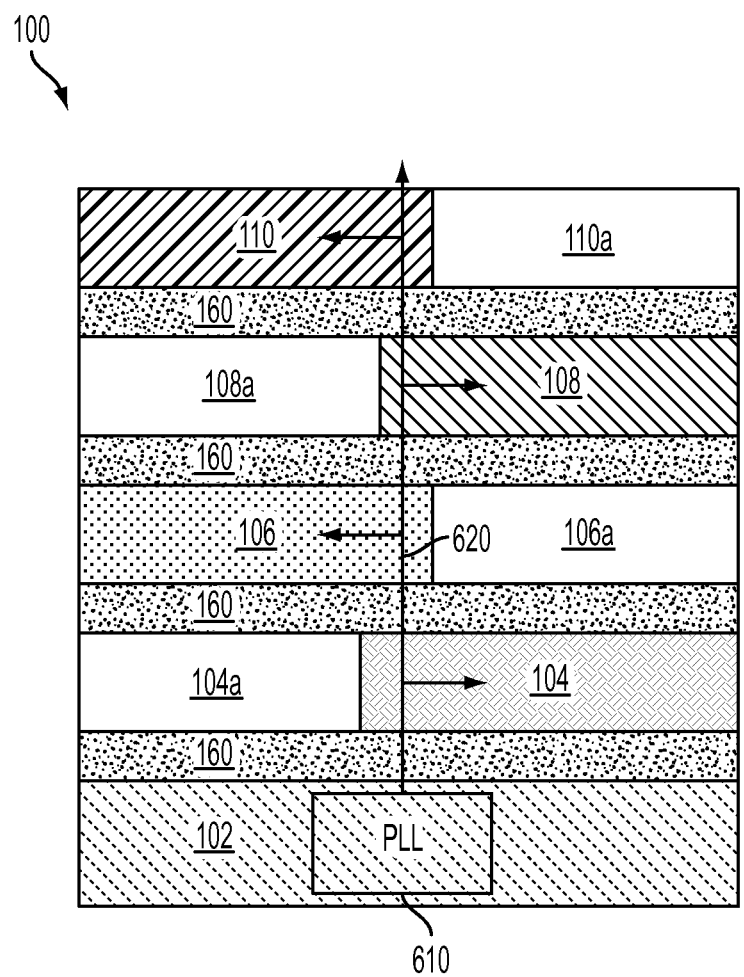
FIG. 6 is a cross sectional view of the stacked chip layout of FIG. 1 including a central clocking tree in accordance with one or more embodiments.

FIG. 6 is a cross sectional view of the stacked chip layout 100 including a central clocking tree in accordance with one or more embodiments. Central processing chip 102 includes a phase locked loop (PLL) 610 configured to generate a global clock signal for synchronizing executed functions in chip layout 100. A clock tree 620 is configured to transfer to the global clock signal to each of first active circuit block 104, second active circuit block 106, third active circuit block 108 and fourth active circuit block 110. Clock tree 620 is formed in full overlap area 130 (FIG. 3). By forming clock tree 620 in full overlap area 130, a length of the clock tree is shorter in comparison with other packaging arrangements. The shorter clock tree reduces a risk of error in the global clock signal received by distance components, e.g., fourth active circuit block 110. The shorter clock tree also reduces delay and jitter in a clock tree signal in comparison with other packaging arrangements because an overall amount of resistance due to inherent resistance of a conductive material of the clock tree is reduced. In some embodiments, additional global broadcast signals generated by central processing chip 102 are also transmitted to first active circuit block 104, second active circuit block 106, third active circuit block 108 and fourth active circuit block 110 by conductive lines and vias formed in full overlap area 130.

Figure 7A:
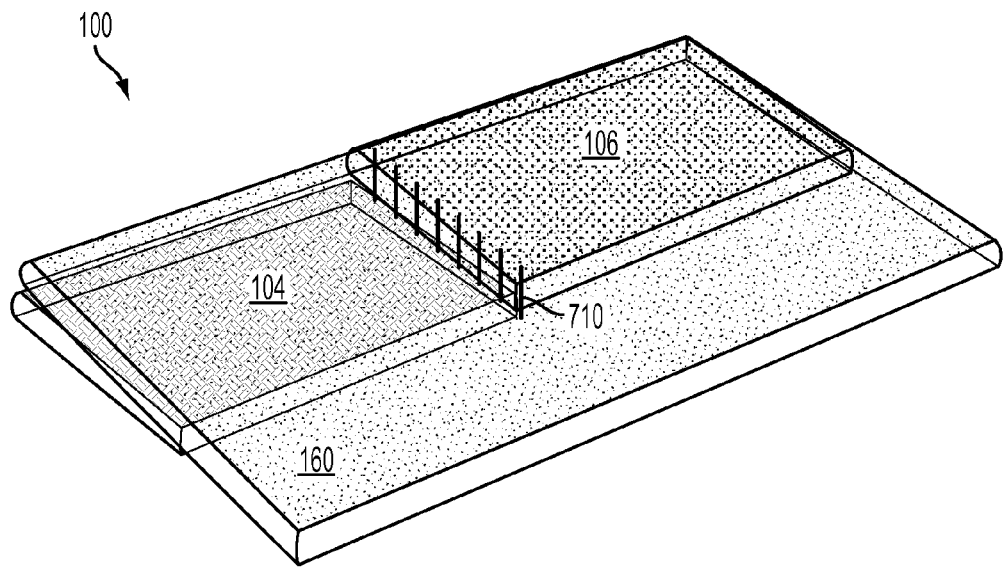
FIGS. 7A and 7B are perspective views of electrical connections between various active circuit blocks of the stacked chip layout of FIG. 1 in accordance with one or more embodiments.

FIG. 7A is a perspective view of electrical connections between various active circuit blocks of the stacked chip layout 100 in accordance with one or more embodiments. Chip layout 100 includes vias 710 electrically connecting first active circuit block 104 to second active circuit block 106. Vias 710 are formed in partial overlap area 120 (FIG. 3) between first active circuit block 104 and second active circuit block 106. Vias 710 extend through ILV layer 160 between first active circuit block 104 and second active circuit block 106. By positioning vias 710 in partial overlap area 120, a length of the vias is reduced in comparison with other packaging arrangements. The location of vias 710 in partial overlap area 120 also reduces interference and cross talk between the vias and other interconnect structures, e.g., power lines 180 (FIG. 4), in chip layout 100. Also by providing vias 710 in partial overlap area 120 a connection location of the vias to first active circuit block 104 and second active circuit block 106 are located only along edges of the first active circuit block and the second active circuit block. By having consistent connection locations for the active circuit blocks, design complexity decreases and production time and costs are reduced in comparison with other packaging arrangements.

Figure 7B:
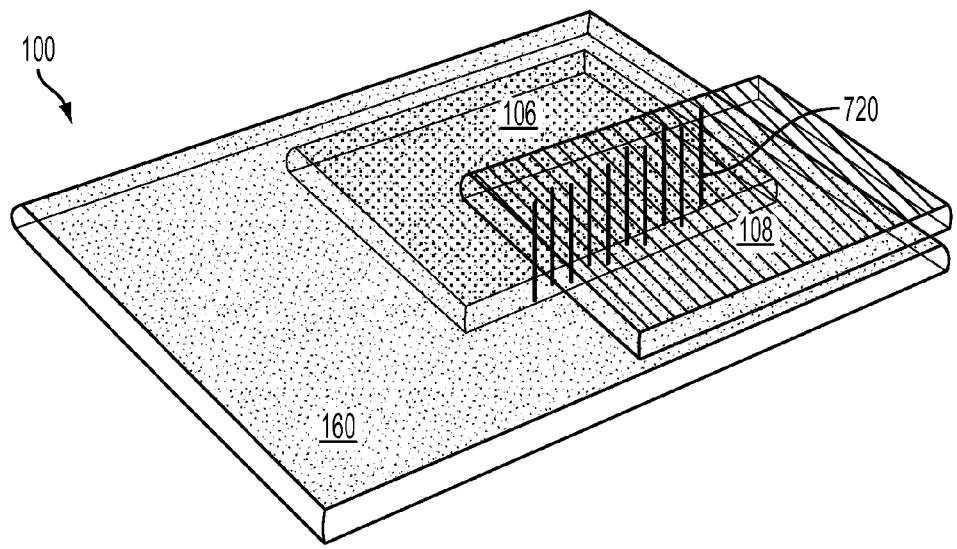

FIG. 7B is a perspective view of electrical connections between various active circuit blocks of the stacked chip layout 100 in accordance with one or more embodiments. Chip layout 100 includes vias 720 electrically connecting third active circuit block 108 to second active circuit block 106. Vias 720 are formed in partial overlap area 120 (FIG. 3) between third active circuit block 108 and second active circuit block 106. Vias 720 extend through ILV layer 160 between third active circuit block 108 and second active circuit block 106. By positioning vias 720 in partial overlap area 120, a length of the vias is reduced in comparison with other packaging arrangements. The location of vias 720 in partial overlap area 120 also reduces interference and cross talk between the vias and other interconnect structures, e.g., power lines 180 (FIG. 4), in chip layout 100. Also by providing vias 720 in partial overlap area 120 a connection location of the vias to third active circuit block 108 and second active circuit block 106 are located only along edges of the third active circuit block and the second active circuit block. By having consistent connection locations in the active circuit blocks, design complexity decreases and production time and costs are reduced in comparison with other packaging arrangements.

Figure 8A:
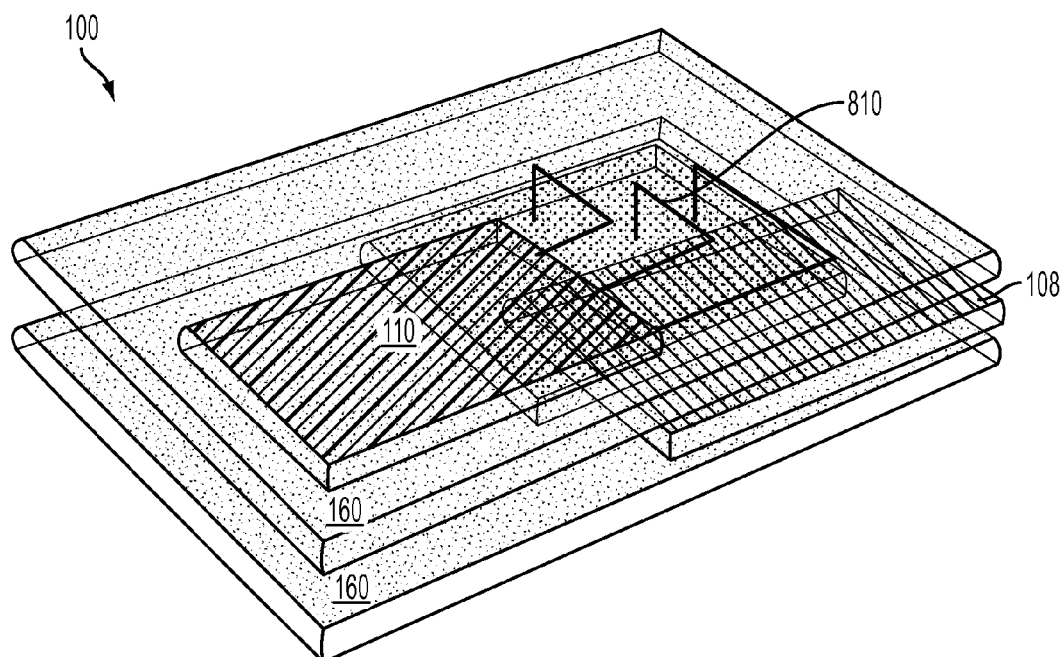
FIG. 8A is a perspective view of electrical connections between various active circuit blocks of the stacked chip layout of FIG. 1 in accordance with one or more embodiments.

FIG. 8A is a perspective view of electrical connections between various active circuit blocks of the stacked chip layout 100 in accordance with one or more embodiments. Chip layout 100 includes electrically connections 810 between fourth active circuit block 110 second active circuit block 106. Electrical connections 810 include conductive lines and vias disposed in fourth routing area 110a and conductive vias extending through third routing area 108a. Electrical connections 810 also pass through ILV layers 160 between fourth routing area 110a and second active circuit block 106. Fourth active circuit block 110 does not include a partial overlap area 120 with second active circuit block 106. Fourth active circuit block 110 only overlaps with second active circuit block 106 in full overlap area 130. Electrical connections 810 are routed around full overlap area 130 to avoid interference between the electrical connections and signals routed in the full overlap area, e.g., clock tree 620 (FIG. 6). In the embodiment of FIG. 8, electrical connections pass above third active circuit block 108. In some embodiments, electrical connections 810 pass above first active circuit block 104. Electrical connections 810 do not pass through either first active circuit block 104 or third active circuit block 108 which reduces the risk of interference with active elements in those active circuit blocks.

Figure 8B:
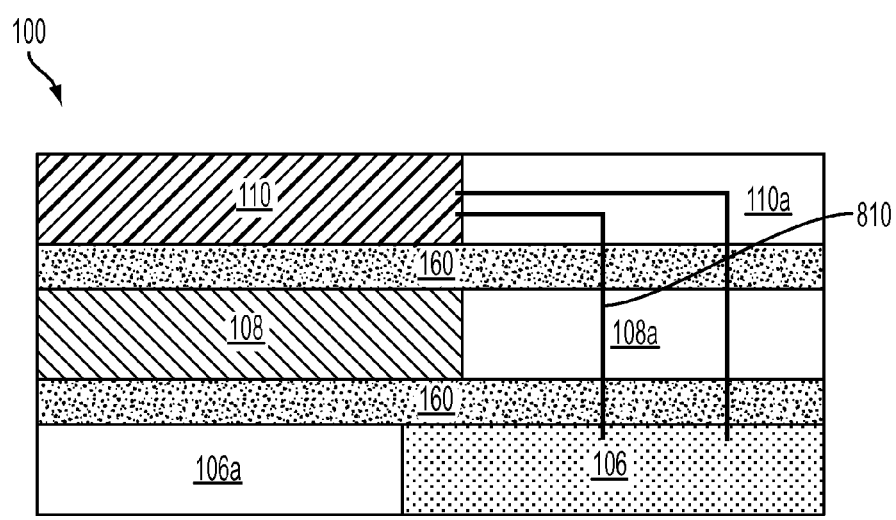
FIG. 8B is a cross sectional view of electrical connections between various active circuit blocks of the stacked chip layout of FIG. 1 in accordance with one or more embodiments.

FIG. 8B is a cross sectional view of electrical connections 810 between fourth active circuit block 110 and second active circuit block 106 of the stacked chip layout 100 in accordance with one or more embodiments. Electrical connections 810 are routed through fourth routing area 110a to a location above third routing area 108a. Routing electrical connections 810 to a position above third routing area 108a reduces interference with active elements in third active circuit block 108 because a separation between the electrical connections and the third active circuit block is greater than in other packaging arrangements. Electrical connections 810 also include vias extending from fourth routing area 110a through third routing area 108a to second active circuit block 106 passing through intervening ILV layers 160. A length of the electrical connections 810 is reduced with respect to a packaging system which connects active circuit blocks located all on a same plane, e.g., 2D packaging arrangements. The shorter length of electrical connections 810 reduces the risk of error in signals transmitted along the electrical connections due to inherent resistance in the electrical connections.

Figure 9:
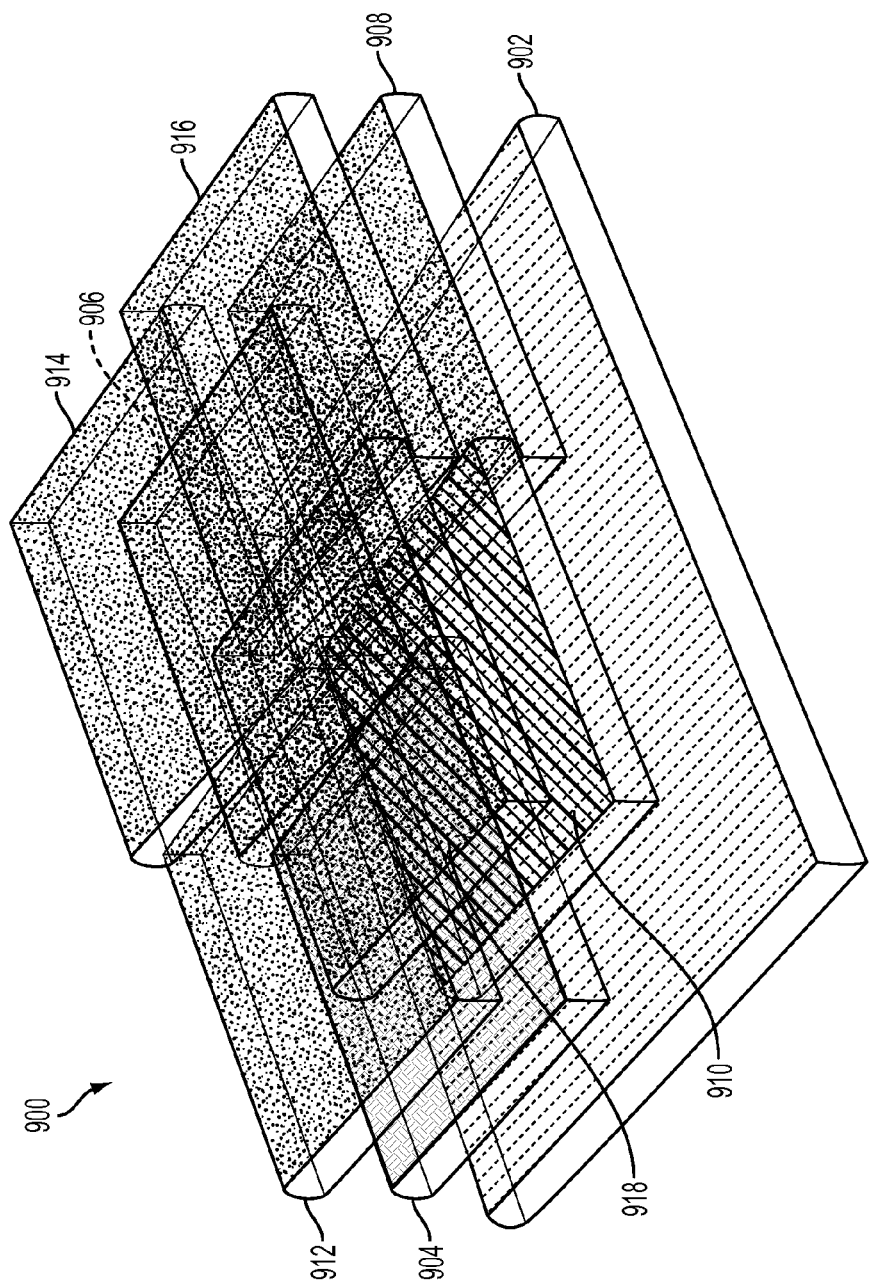
FIG. 9 is a perspective view of a stacked chip layout including eight active circuit blocks in accordance with one or more embodiments.

FIG. 9 is a perspective view of a stacked chip layout 900 including eight active circuit blocks in accordance with one or more embodiments. Chip layout 900 includes eight active circuit block blocks 904-918 positioned in over a central processing chip 902. The eight active circuit blocks 904-918 are arranged using similar guidelines as in chip layout 100. The eight active circuit blocks 904-918 are each arranged on separate planes. Each active circuit block of active circuit blocks 906-918 partially overlaps at least one of other of the active circuit blocks 904-916. None of the active circuit blocks 906-918 fully overlaps any of the active circuit blocks 904-916. A full overlap area exists were a portion of each of active circuit blocks 904-918 overlap with every other of the active circuit blocks 904-918, similar to full overlap area 130 of chip layout 100.

A size of active circuit blocks 904-918 is similar to the size of the active circuit blocks of chip layout 100. The increased number of active circuit blocks in chip layout 900 results in a greater amount of overlap with other active circuit blocks.

A non-limiting example of placement of active circuit blocks 904-918 includes placing a first active circuit block 904 in a location aligned with a first corner of central processing chip 902 at an intersection of a first edge and a second edge the central processing chip. A second active circuit block 906 is aligned with the first edge of central processing chip 902. Second active circuit block 906 does not extend to a second corner of central processing chip 902 at an intersection of the second edge and a third edge of the central processing chip. A third active circuit block 908 is located in a third corner of central processing chip 902 at an intersection of the third edge and a fourth edge of the central processing chip. A fourth active circuit block 910 is aligned with the fourth edge of central processing chip 902. Fourth active circuit block 910 does not extend to a fourth corner of central processing chip 902 at an intersection of the first edge and the fourth edge. A fifth active circuit block 912 is aligned with the fourth edge of central processing chip 902, but does not extend to the first corner of the central processing chip. A sixth active circuit block 914 is aligned with the second corner of central processing chip 902. A seventh active circuit block 916 is aligned with the third edge of central processing chip 902, but does not extend to the third corner of the central processing chip. An eighth active circuit block 918 is aligned with the fourth corner of central processing chip 902.

Routing areas corresponding to each of active circuit blocks 904-918 are not shown for the sake of simplicity. However, the routing areas are present in chip layout 900 to provide a routing path between various active circuit blocks 904-918 which avoid passing electrical connections through other active circuit blocks.

Figure 10:
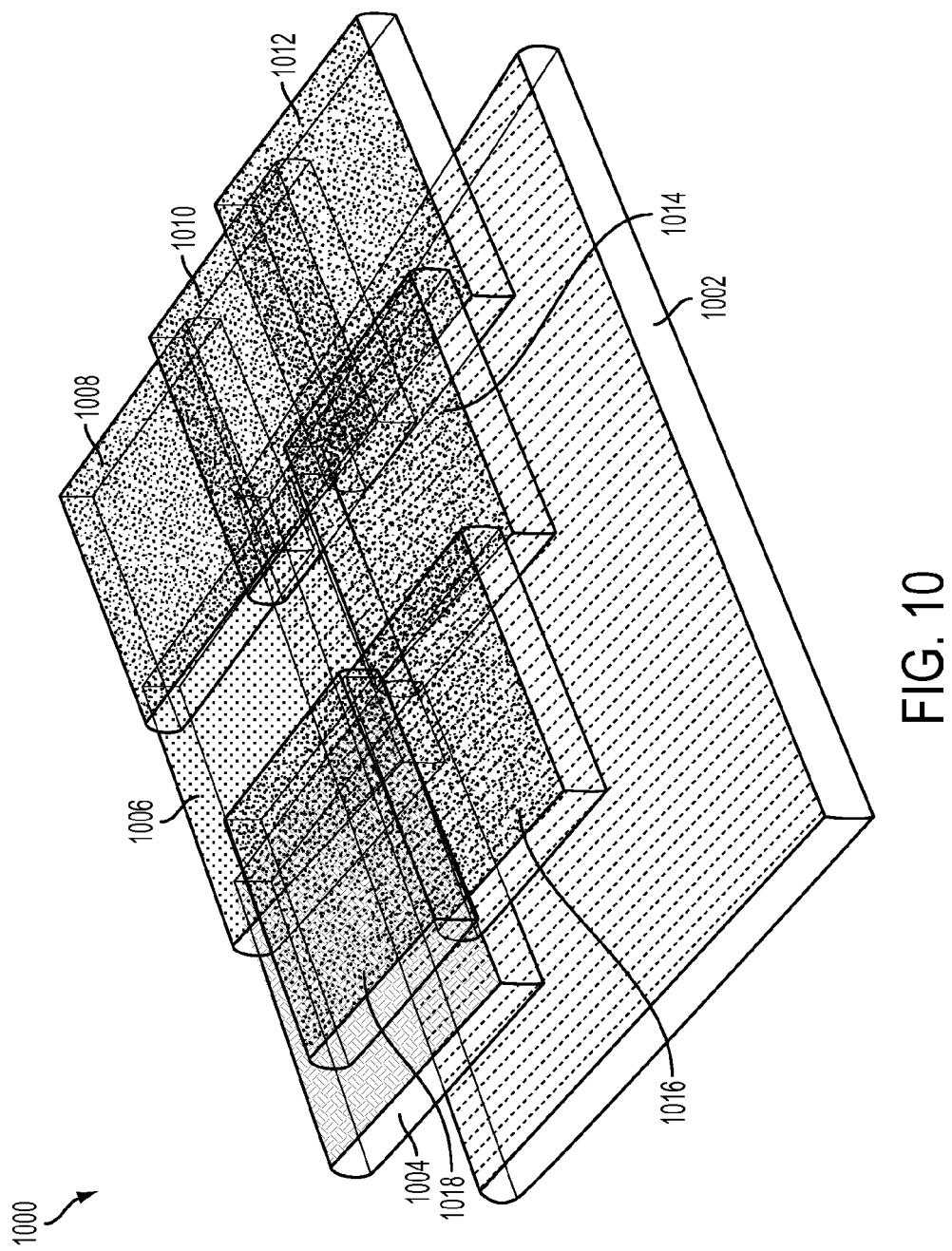
FIG. 10 is a perspective view of a stacked chip layout including eight active circuit blocks in accordance with one or more embodiments.

FIG. 10 is a perspective view of a stacked chip layout 1000 including eight active circuit blocks in accordance with one or more embodiments. Chip layout 10000 includes eight active circuit block blocks 1004-1018 positioned in over a central processing chip 1002. The eight active circuit blocks 1004-1018 are arranged using similar guidelines as in chip layout 100. The eight active circuit blocks 1004-1018 are each arranged on separate planes. Each active circuit block of active circuit blocks 1006-1018 partially overlaps at least one of other of the active circuit blocks 1004-1016. None of the active circuit blocks 1006-1018 fully overlaps any of the active circuit blocks 1004-1016. A full overlap area exists were a portion of each of active circuit blocks 1004-1018 overlap with every other of the active circuit blocks 1004-1018, similar to full overlap area 130 of chip layout 100.

A size of active circuit blocks 1004-1018 is smaller in comparison with the size of the active circuit blocks of chip layout 100 and chip layout 900. The reduced size of active circuit blocks 1004-1018 results in a decreased amount of overlap between the active circuit blocks in comparison with chip layout 900.

A non-limiting example of placement of active circuit blocks 1004-1018 includes placing a first active circuit block 1004 in a location aligned with a first corner of central processing chip 1002 at an intersection of a first edge and a second edge the central processing chip. A second active circuit block 1006 is aligned with the first edge of central processing chip 902. Second active circuit block 1006 does not extend to a second corner of central processing chip 1002 at an intersection of the second edge and a third edge of the central processing chip. A third active circuit block 1008 is located in the second corner of central processing chip 1002. A fourth active circuit block 1010 is aligned with the third edge of central processing chip 1002. Fourth active circuit block 1010 does not extend to a third corner of central processing chip 1002 at an intersection of the third edge and a fourth edge of the central processing chip. A fifth active circuit block 1012 is aligned with the third corner of central processing chip 1002. A sixth active circuit block 1014 is aligned with the fourth edge of central processing chip 1002, but does not extend to a fourth corner of the central processing chip at an intersection of the first edge and the fourth edge of the central processing chip. A seventh active circuit block 1016 is aligned with the fourth corner of central processing chip 1002. An eighth active circuit block 1018 is aligned with the fourth edge of central processing chip 902, but does not extend to the first corner of the central processing chip.

Routing areas corresponding to each of active circuit blocks 1004-1018 are not shown for the sake of simplicity. However, the routing areas are present in chip layout 1000 to provide a routing path between various active circuit blocks 1004-1018 which avoid passing electrical connections through other active circuit blocks.

Figure 11:
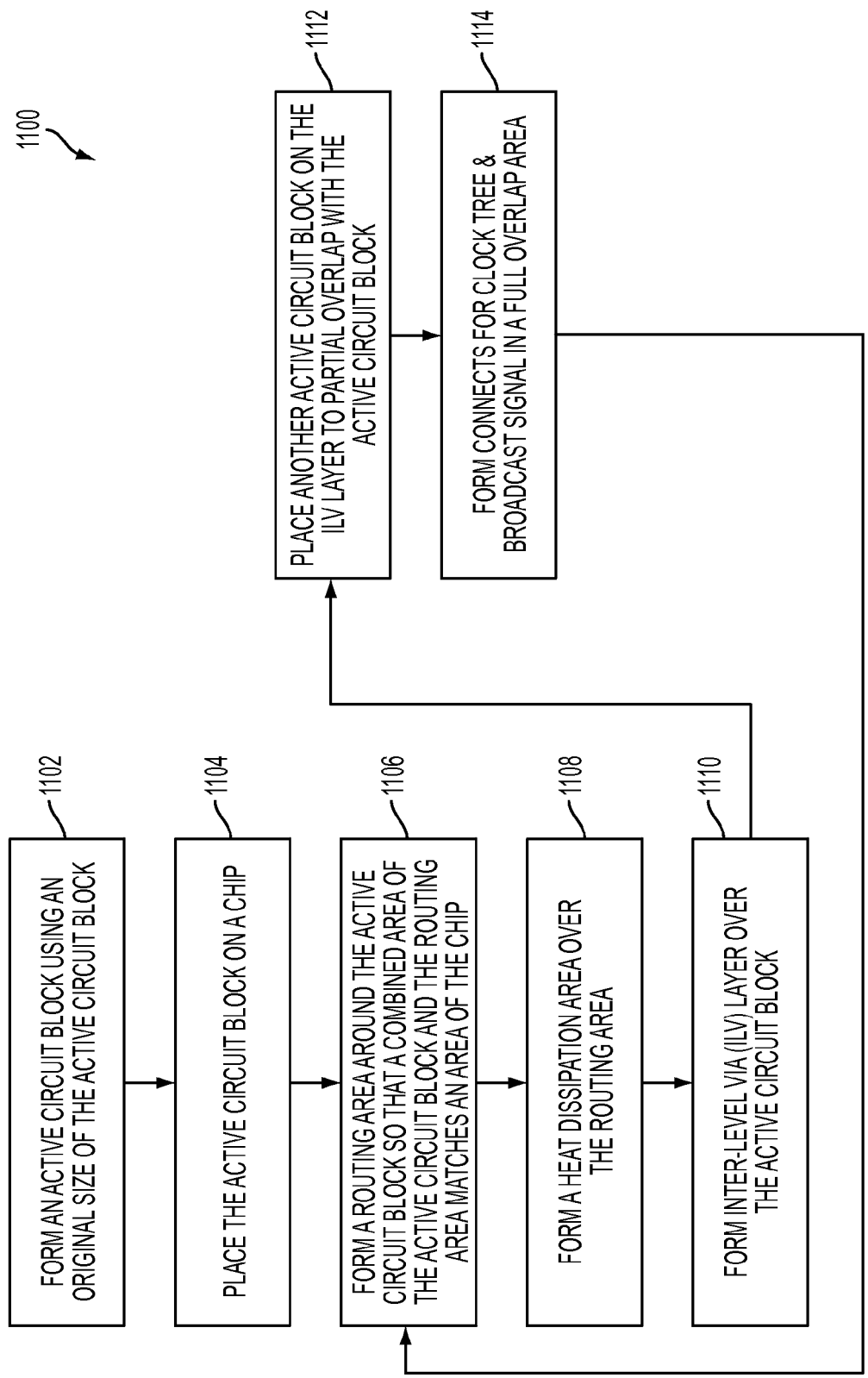
FIG. 11 is a flow chart of a method of making a stacked chip layout in accordance with one or more embodiments.

FIG. 11 is a flow chart of a method 1100 of making a stacked chip layout in accordance with one or more embodiments. Method 1100 begins with operation 1102 in which an active circuit block is formed using an original size of the active circuit block. The active circuit block formed in operation 1102 is not subjected to an artificial increase in size to provide additional space for routing of electrical connections between active circuit blocks. In some embodiments, the active circuit block is a memory device or an ASIC device, e.g., first active circuit block 104 (FIG. 1).

Method 1100 continues with operation 1104 in which the active circuit block is placed on a chip. An area of the chip is greater than an area of the active circuit block. In some embodiments, the chip is a central processing chip, e.g., central processing chip 102 (FIG. 1). In some embodiments, placing the active circuit block on the chip includes electrically connecting the active circuit block to the chip. In some embodiments, an ILV layer is formed on the chip prior to placing the active circuit block on the chip, and the active circuit block is electrically connected to the chip through the ILV layer.

In some embodiments, the active circuit block is bonded to the chip using solder balls, copper posts or other suitable connection elements. In some embodiments, a molding material or underfill material is used to increase a mechanical strength of the bond between the active circuit block and the chip.

In operation 1106 a routing area is formed around the active circuit block so that a combined area of the active circuit block and the routing area match the area of the chip. In some embodiments, the routing area includes a dielectric material. In some embodiments, the routing area is formed by physical vapor deposition (PVD), chemical vapor deposition (CVD), atomic layer deposition (ALD), an epitaxial process, or other formation processes. In some embodiments, the routing area includes a multi-layer element.

In some embodiments, openings for conductive lines and/or vias are formed in the routing area. In some embodiments, the openings are for power lines for providing power to the active circuit block. In some embodiments, the openings are formed using a photolithography and etching process. In some embodiments, the openings are formed using a dual damascene process. The openings are then filled with a conductive material to form conductive lines and/or vias to provide electrical connections for the active circuit block and subsequently added active circuit blocks. In some embodiments, the conductive material is formed by sputtering, PVD, ALD, electroplating or other suitable formation methods. In some embodiments, a planarizing process, e.g., chemical mechanical polishing (CMP), is performed to remove excess conductive material following filling the openings.

Method 1100 continues with operation 1108 in which a heat dissipation element is formed over the routing area. In some embodiments, the heat dissipation element includes copper, aluminum, alloys thereof or other suitable thermally conductive materials. In some embodiments, the heat dissipation element is formed over both the active circuit block and the routing area. In some embodiments, the heat dissipation element contacts a sidewall of the active circuit block. In some embodiments, the heat dissipation element is formed by sputtering, PVD, ALD, electroplating or other suitable formation methods.

In operation 1110 an inter-level via (ILV) layer is formed over the active circuit block. The ILV layer is formed over the routing area as well as the active circuit block. The ILV layer is a dielectric layer in which vias are formed to provide electrical connection between various active circuit blocks. In some embodiments, a material of ILV layer is different from a material of the routing area, so that the routing area acts as an etch stop during formation of via openings in the ILV layer. Similarly, the ILV layer can act as an etch stop during formation of the openings in the routing area. In some embodiments, the ILV layer is formed by PVD, CVD, ALD, an epitaxial process or another suitable formation method.

In some embodiments, the via openings in the ILV layer are formed by a combination of photolithography and etching processes. The via openings are then filled with a conductive material to form conductive vias to provide electrical connections for the active circuit block and subsequently added active circuit blocks. In some embodiments, the conductive material is formed by sputtering, PVD, ALD, electroplating or other suitable formation methods. In some embodiments, a planarizing process, e.g., CMP, is performed to remove excess conductive material following filling the via openings.

Method 1100 continues with operation 1112 in which another active circuit block is placed on the ILV layer. The other active circuit block partially overlaps with prior placed active circuit blocks, but does not fully overlap with the prior placed active circuit blocks. In some embodiments, the active circuit block is bonded to the chip using solder balls, copper posts or other suitable connection elements. In some embodiments, a molding material or underfill material is used to increase a mechanical strength of the bond between the active circuit block and the chip. In some embodiments, the connection elements and method in operation 1112 are the same as the connection elements and method in operation 1104. In some embodiments, the connection elements or method in operation 1112 is different from the connection elements or method in operation 1104.

In operation 1114 connects for a clock tree and broadcast signals are formed in a full overlap area. The full overlap area, e.g., full overlap area 130 (FIG. 3), is a location where all active circuit blocks overlap with one another. In some embodiments, the clock tree, e.g., clock tree 620 (FIG. 6), and broadcast signal lines are formed in the full overlap area by a combined photolithography and etching process followed by a metallization and planarization process.

One aspect of this description relates to a method of making a stacked chip layout. The method includes placing a first active circuit block over a central processing chip having a first area, the first active circuit block having a second area less than the first area. The method further includes placing a second active circuit block over the first active circuit block, the second active circuit block having a third area less than the first area, wherein the second active circuit block partially overlaps the first active circuit block and exposes a portion of the first active circuit block. The method further includes placing a third active circuit block over the second active circuit block, the third active circuit block having a fourth area less than the first area, wherein the third active circuit block partially overlaps at least one of the first active circuit block or the second active circuit block, and the third active circuit block exposes at least a portion of the first active circuit block and the second active circuit block.

Another aspect of this description relates to a method of making a stacked chip layout. The method includes placing a first active circuit block in a first level over a central processing chip, wherein the central processing chip has a first area, and the first active circuit block having a second area less than the first area. The method further includes forming a first routing region in the first level, wherein the first routing region has a third area less than the first area. The method further includes placing a second active circuit block in a second level over the first level, wherein the second active circuit block has a fourth area less than the first area, and the second active circuit block partially overlaps both the first active circuit block and the first routing region. The method further includes forming a second routing region in the second level, wherein the second routing region has a fifth area less than the first area, and the second routing region partially overlaps both the first active circuit block and the first routing region.

Still another aspect of this description relates to a method of making a stacked chip layout. The method includes placing an active circuit block of a plurality of active circuit blocks over a central processing chip, wherein an area of each active circuit block of the plurality of active circuit blocks is less than an area of the central processing chip. The method further includes forming a routing region around a corresponding active circuit block of the plurality of active circuit blocks. The method further includes repeating, for each remaining active circuit block of the plurality of active circuit blocks, the placing the active circuit block and the forming the routing region, wherein the plurality of active circuit blocks define a full overlap region where every active circuit block of the plurality of active circuit blocks overlaps every other active circuit block of the plurality of active circuit blocks. The method further includes forming a global conductive element in the full overlap region, wherein the global conductive element is electrically connected to every active circuit block of the plurality of active circuit blocks.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of making a stacked chip layout, the method comprising:
placing a first active circuit block over a central processing chip having a first area, the first active circuit block having a second area less than the first area;
placing a second active circuit block over the first active circuit block, the second active circuit block having a third area less than the first area, wherein the second active circuit block partially overlaps the first active circuit block and exposes a portion of the first active circuit block, and a center of the second active circuit block is displaced from a center of the first active circuit block in a first direction parallel to a top surface of the central processing chip; and placing a third active circuit block over the second active circuit block, the third active circuit block having a fourth area less than the first area, wherein the third active circuit block partially overlaps at least one of the first active circuit block or the second active circuit block, the third active circuit block exposes at least a portion of the first active circuit block and the second active circuit block, and a center of the third active circuit block is displaced from the center of the first active circuit block in a second direction, different from the first direction, parallel to the top surface of the central processing chip.

2. The method of claim 1, further comprising:

forming a first routing area around the first active circuit block, the first routing area having an area equal to a difference between the second area and the first area;

forming a second routing area around the second active circuit block, the second routing area having an area equal to a difference between the third area and the first area; and forming a third routing area around the third active circuit block, the third routing area having an area equal to a difference between the fourth area and the first area.

3. The method of claim 2, further comprising forming a first heat dissipation element in thermal contact with the first active circuit block, the first heat dissipation element extending over a surface of the first routing area.

4. The method of claim 2, wherein placing the third active circuit block comprises exposes an entirely of the first active circuit block, and forming the third routing area comprises forming at least one conductive line in the third routing area, the at least one conductive line electrically connecting the third active circuit block to the first active circuit block.

5. The method of claim 1, further comprising forming a conductive element in an area where the third active circuit block overlaps both the second active circuit block and the first active circuit block, the conductive element configured to transfer a global signal from the central processing chip to each of the first active circuit block, the second active circuit block and the third active circuit block.

6. A method of making a stacked chip layout, the method comprising:

placing a first active circuit block in a first level over a central processing chip, wherein the central processing chip has a first area, and the first active circuit block having a second area less than the first area;

forming a first routing region in the first level, wherein the first routing region has a third area less than the first area;

placing a second active circuit block in a second level over the first level, wherein the second active circuit block has a fourth area less than the first area, and the second active circuit block partially overlaps both the first active circuit block and the first routing region; and forming a second routing region in the second level, wherein the second routing region has a fifth area less than the first area, and the second routing region partially overlaps both the first active circuit block and the first routing region.

7. The method of claim 6, further comprising forming an interconnect structure in the second routing region to electrically connect the second active circuit block to the first active circuit block.

8. The method of claim 6, further comprising forming an interconnect structure in the second routing region to electrically connect the second active circuit block to the central processing chip, wherein the interconnect structure bypasses the first active circuit block.

9. The method of claim 6, wherein forming the first routing region comprises forming the first routing region to occupy an entirety of the first level except for the second area.

10. The method of claim 6, wherein forming the second routing region comprises forming the second routing region to occupy an entirety of the second level except for the fourth area.

11. The method of claim 6, further comprising placing a third active circuit block in a third level over the second level, wherein the third active block has a sixth area less than the first area, and the third active circuit block partially overlaps the first routing region and the second routing region.

12. The method of claim 11, further comprising forming an interconnect structure through the first routing region and the second routing region to electrically connect the third active circuit block to the first active circuit block.

13. The method of claim 11, further comprising forming a third routing region in the third level, wherein a combined area of the third routing region and the sixth area is equal to the first area.

14. The method of claim 13, wherein forming the third routing region comprises forming the third routing region overlapping both the first active circuit block and the second active circuit block.

15. A method of making a stacked chip layout, the method comprising:

placing an active circuit block of a plurality of active circuit blocks over a central processing chip, wherein an area of each active circuit block of the plurality of active circuit blocks is less than an area of the central processing chip;

forming a routing region around a corresponding active circuit block of the plurality of active circuit blocks;

repeating, for each remaining active circuit block of the plurality of active circuit blocks, the placing the active circuit block and the forming the routing region, wherein the plurality of active circuit blocks define a full overlap region where every active circuit block of the plurality of active circuit blocks overlaps every other active circuit block of the plurality of active circuit blocks, and a center of one active circuit block of the plurality of active circuit blocks is displaced from a center of another active circuit block of the plurality of active circuit blocks in two directions parallel to a top surface of the central processing chip; and forming a global conductive element in the full overlap region, wherein the global conductive element is electrically connected to every active circuit block of the plurality of active circuit blocks.

16. The method of claim 15, further comprising forming an inter-level via layer over each circuit block of the plurality of active circuit blocks and the routing region for the corresponding active circuit block.

17. The method of claim 16, further comprising forming a conductive via connecting a first active circuit block of the plurality of active circuit blocks to a second active circuit block of the plurality of active circuit blocks, wherein the conductive via bypasses the routing region corresponding to the first active circuit block and the routing region corresponding to the second active circuit block.

18. The method of claim 15, further comprising forming a heat dissipating area over the routing region for each active circuit block of the plurality of active circuit blocks.

19. The method of claim 15, wherein forming the routing region for the corresponding active circuit block of the plurality of active circuit blocks comprises forming the routing region to occupy an area equal to a difference between the area of the central processing chip and the area of the corresponding active circuit block.

20. The method of claim 15, forming an interconnect structure in the routing region for a first active circuit block of the plurality of active circuit blocks to electrically connect the first active circuit block to a second active circuit block of the plurality of active circuit blocks.

\* \* \* \* \*